J. MULLER.
Hay and Cotton Presses.
No. 143,586. Patented Oct. 14, 1873.
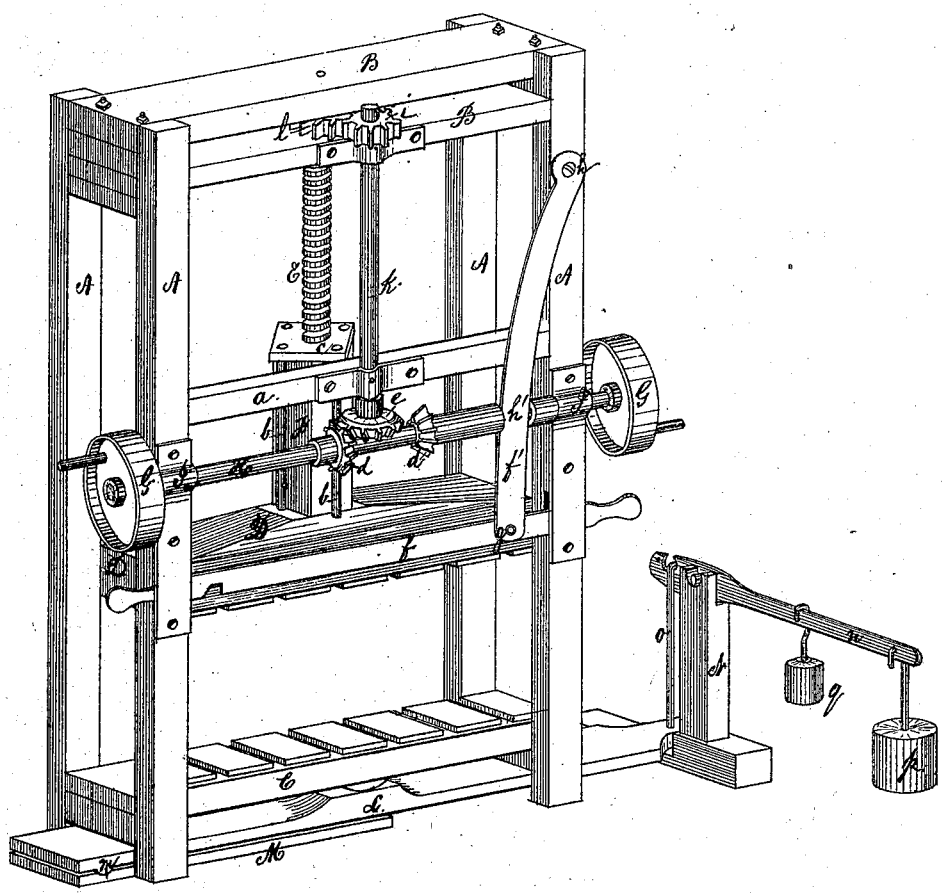
Witnesses.
INVENTOR-
Joseph Müller
Per. Jenkins & Olmstead
Attorneys

UNITED STATES PATENT OFFICE.

JOSEPH MÜLLER, OF NACOGDOCHES, TEXAS.

IMPROVEMENT IN HAY AND COTTON PRESSES.

Specification forming part of Letters Patent No. 143,586, dated October 14, 1873; application filed July 5, 1873.

*To all whom it may concern:*

Be it known that I, JOSEPH MÜLLER, of the town and county of Nacogdoches and State of Texas, have invented a new, useful, and Improved Baling-Press; and I hereby declare the following to be a full, clear, and exact description of the same, reference being had to the accompanying illustrative drawing forming a part of this specification.

My improvement consists in the combination of a baling-press in which the follower is worked by a screw with a platform-scales, wherewith any required quantity of cotton may be placed in the bale before the process of pressing the same is completed, and whereby uniformity of weight as to all the said bales of cotton may be secured.

My improvement is shown upon the drawing by an elevation in perspective, and by reference thereto it will be shown that similar letters of reference indicate corresponding parts of the device.

The heavy upright standards or framing-timbers, which constitute the means of support of the whole device, are shown at A.

The doors and sides, which are essential to the formation of the pressing-box under the follower, are not necessarily shown on the drawing, as they constitute no part of my invention.

The said upright framing-timbers A are securely held together at their top by means of the cross-head timbers B, and at their lower extremities by the stationary platen C. Other connecting-timbers are likewise introduced at or near the center of their length, as shown at $a$. The above framing-timbers are sufficiently substantial and sufficiently well framed together to preclude, by any possibility, the pressing-box from spreading laterally when the bale of cotton is being subjected to the pressure of the follower as it descends thereupon. This follower is shown at D, and its operation is effected by means of the screw E working in the nut F. This said nut F is rigidly secured to the follower D by means of the bolts $b$, the lower ends of which pass through the follower, and their upper ends through the metal cap $c$ placed thereupon. The revolutions of the screw E are effected by means of hand, animal, or steam power applied to one or both of the drums G, which are keyed to the shaft H. The said shaft H has its bearings in the journals I, which are bolted to the upright framing-timbers A aforesaid. Upon the said shaft H are the bevel-pinions $d$, which are rigidly keyed thereto, and which may be thrown into gear with the bevel-wheel $e$, which is placed upon the lower extremity of the upright shaft K, by means of the shifting-levers $f$ and $f'$. The hand applied to the outer extremities of the lever $f$ will effect its horizontal movement, and likewise move the lever $f'$, therewith connected at the point $g$. The said lever $f'$ is pivoted to the frame A at the point $h$, and bears against the shaft H in a groove at the point $h'$. The shaft H has sufficient lateral movement in its bearings I to enable either of the bevel-pinions $d$ aforesaid to be thrown into or out of gear with the said bevel-wheel $e$, for the purposes of effecting either its direct or its reverse movement, and consequently either the direct or reverse revolutions of the screw E, to which motion is communicated from the bevel-wheel $e$ through the shaft K and cog-wheels $i$ and $l$, as will be plainly seen by an examination of the drawing.

As the screw E is revolved in the manner and by the means above explained, it is obvious that the follower D will be raised or lowered, as may be desired.

The whole of the pressing device above described rests upon the platform L of the scales. One end of the said platform L rests upon the bed-plate M at the point $m$, while the opposite end may be raised or lowered, and with it the baling-press, by means of the beam $h$ having its fulcrum upon the standard N and stationary rod $o$.

The weights $p$ and $q$ may be of a capacity, and regulated upon the said beam $n$, so as in the usual manner to indicate the exact weight of the baling-press and the cotton therein contained; and the weight of the press being at all times known, the weight of the cotton is, of course, easily determined.

It is evident that my baling-press may be used for all purposes for which a press of the character to which this relates may be applied, such as the baling of hay, moss, wool, hides, hemp, rags, or any other material required to be baled, for the purposes of transportation to a market.

Having described my invention, what I desire to secure by Letters Patent is the following claim:

The press A, so resting on a pivoted platform, $h$, as to operate in connection with an ordinary scale, substantially as described.

J. MÜLLER.

Witnesses:
L. J. OLMSTEAD,
H. N. JENKINS.